United States Patent
Chen et al.

(10) Patent No.: US 9,371,402 B2
(45) Date of Patent: Jun. 21, 2016

(54) METHOD FOR PRODUCING CROSS-LINKED HYALURONIC ACID

(75) Inventors: Tor-Chern Chen, Kaohsiung (TW); Li-Su Chen, Kaohsiung (TW)

(73) Assignee: SCIVISION BIOTECH INC., K.E.P.Z. (TW)

( * ) Notice: Subject to any disclaimer, the term of this patent is extended or adjusted under 35 U.S.C. 154(b) by 351 days.

(21) Appl. No.: 13/316,840

(22) Filed: Dec. 12, 2011

(65) Prior Publication Data

US 2012/0095206 A1 Apr. 19, 2012

Related U.S. Application Data

(63) Continuation-in-part of application No. 12/385,502, filed on Apr. 9, 2009, now abandoned.

(51) Int. Cl.
*C08B 37/08* (2006.01)

(52) U.S. Cl.
CPC .................................. *C08B 37/0072* (2013.01)

(58) Field of Classification Search
CPC .......... C08B 37/00; C08B 15/00; A61K 8/73; A61K 31/715
See application file for complete search history.

(56) References Cited

U.S. PATENT DOCUMENTS

| | | | |
|---|---|---|---|
| 4,716,154 A | 12/1987 | Malson et al. | |
| 4,716,224 A | 12/1987 | Sakurai et al. | |
| 8,481,080 B2 * | 7/2013 | Longin et al. | 424/484 |
| 2002/0049281 A1 | 4/2002 | Zhao et al. | |
| 2005/0281880 A1 | 12/2005 | Wang | |
| 2006/0194758 A1 | 8/2006 | Lebreton | |
| 2006/0246137 A1 | 11/2006 | Hermitte et al. | |
| 2007/0026070 A1 | 2/2007 | Vonwiller et al. | |
| 2007/0065783 A1 * | 3/2007 | Tuttle | A61C 5/02 433/224 |

FOREIGN PATENT DOCUMENTS

| | | | |
|---|---|---|---|
| CN | 101244290 | 8/2008 | |
| CN | 101724164 | 6/2010 | |
| EP | 0939086 | 9/1999 | |
| EP | 1818344 | 8/2007 | |
| EP | 2236523 | 10/2010 | |
| JP | 60-233101 | 11/1985 | |
| JP | H02-138346 A | 5/1990 | |
| JP | H07-102002 A | 4/1995 | |
| JP | 2010-77434 | 4/2010 | |
| TW | 201012865 | 4/2010 | |
| WO | 00/46253 | 8/2000 | |
| WO | 2006-051950 A1 | 5/2006 | |
| WO | WO 2007129828 A1 * | 11/2007 | C12M 3/00 |

OTHER PUBLICATIONS

Constable, D. J., Jimenez-Gonzalez, C., & Henderson, R. K. (2007). Perspective on solvent use in the pharmaceutical industry. Organic process research & development, 11(1), 133-137.*

Tezel, A., & Fredrickson, G. H. (2008). The science of hyaluronic acid dermal fillers. Journal of Cosmetic and Laser Therapy, 10(1), 35-42.*
US 5,808,050, 9/1998, Mares-Guia (withdrawn).
Y. Tokita et al., Hydrolytic degradation of hyaluronic acid, Polymer Degradation and Stability, 1995, pp. 269-273, vol. 48.
Hans J.C.F. Nelis et al., A Sensitive Fluorimetric Procedure for the Determination of Aliphatic Epoxides under Physiological Conditions, Analytical Biochemistry, 1981, pp. 151-157, vol. 115.
European Search Report for 09004561.8-2115, which is a corresponding application, that cites US2002/049281, and U.S. Pat. No. 4,716,154, EP 1818344, US 2006/246137, EP 0939086, Jinghua et al., Characteristics of hyaluronic acid derivative films cross-linked by polyethylene glycol of low water content, Journal of Medical Colleges of PLA, Shanghai, CN, Feb. 1, 2008, pp. 15-19, vol. 23, No. 1, and Tomihata K. et al., Preparation of cross-linked hyaluronic acid films of low water content, Biomaterials, Feb. 1, 1997, pp. 189-195, vol. 18, No. 3.
European Office Action for 09004561.8-2115, which is a corresponding European application.
Chinese Office Action dated Jan. 30, 2011 for 200810172328.6, which is a corresponding Chinese application, that cites CN 101244290, and US 2007/0026070.
Chinese Office Action dated Jul. 1, 2011 for 200810172328.6, which is a corresponding Chinese application.
Jinghua et al., Characteristics of hyaluronic acid derivative films cross-linked by polyethylene glycol of low water content, Journal of Medical Colleges of PLA, Shanghai, CN, Feb. 1, 2008, pp. 15-19, vol. 23, No. 1.
Tomihata K. et al., Preparation of cross-linked hyaluronic acid films of low water content, Biomaterials, Feb. 1, 1997, pp. 189-195, vol. 18, No. 3.
Office Action issued on Oct. 23, 2012 of the corresponding JP patent application No. 2009-219164 cites WO 2006-051950, JP 60-233101, JP H07-102002, and JP H02-138346.
English abstract of Office Action issued on Oct. 23, 2012 of the corresponding JP patent application No. 2009-219164.
English abstract of WO 2006-051950, JP 60-233101, JP H07-102002, and JP H02-138346.

* cited by examiner

*Primary Examiner* — Eric Olson
*Assistant Examiner* — Dale R Miller
(74) *Attorney, Agent, or Firm* — WPAT, P.C., Intellectual Property Attorneys; Anthony King

(57) ABSTRACT

A method for producing a cross-linked hyaluronic acid in accordance with the present invention comprises: (a) cross-linking at least one polymer at a temperature, from about 35° C. to about 60° C., for a reaction time of from about 0.1 hour to about 72 hours with a cross-linking agent; and (b) lowering the temperature in step (a) to form about 10° C. to about 30° C. for a reaction time of from about 48 hours to about 28 days to obtain the cross-linked hyaluronic acid, whereby, a cross-linking agent content in a product of the method can be decreased so the product does not require purification.

12 Claims, No Drawings

METHOD FOR PRODUCING CROSS-LINKED HYALURONIC ACID

CROSS REFERENCE TO RELATED APPLICATIONS

This nonprovisional utility application is a continuation-in-part of and claims the benefit under 35 U.S.C. §120 to co-pending U.S. application Ser. No. 12/385,502 filed Apr. 9, 2009, all of which are incorporated, in their entirety, by this reference.

BACKGROUND OF THE INVENTION

1. Field of the Invention

The present invention relates to a method for producing a cross-linked hyaluronic acid, especially producing cross-linking hyaluronic acid with decreased cross-linking agent content.

2. Description of the Prior Arts

Hyaluronic acid is a kind of polysaccharides, which is composed of disaccharides and 400 D of molecular weight. The disaccharide is composed of β-1,4-glucuronic acid and β-1,3-N-acetylglucosamine linked together by β-1,4 glycosidic bond. Moreover, the disaccharide links other disaccharides by β-1,3 glycosidic bonds to form linear polysaccharide. Currently, hyaluronic acid is synthesized by bacteria such as *streptococcus* and is obtained by extracted from animal tissues such as from cockscomb.

Since hyaluronic acid, hyaluronate and derivatives thereof have good biocompatibility, bio-degradability and viscoelasticity, they can be used in cosmetics, biomedicine, medical products and pharmaceutical industry.

Since the organism of linear hyaluronic acid can be easily degraded by enzymes, such as hyaluronidase and free radicals, residence time of the organism of linear hyaluronic acids is relevantly shorter. Furthermore, linear hyaluronic acid has low mechanical strength, so the linear hyaluronic acid has limited applications. Therefore, the cross-linked hyaluronic acid is most preferably used.

When practicing the operating method, the cross-linked hyaluronic acid have different type to the different goal, such as a solution type, a hydrogel type, a matter between a solution type and hydrogel type, and a mixture consisting of a solution type and a hydrogel type. A manufacture method for producing the cross-linked hyaluronic acid comprises: mixing a cross-linking agent and hyaluronic acid to proceed a cross-linking reaction and to obtain the cross-linked hyaluronic acid; and purifying the cross-linked hyaluronic acid to remove the excess cross-linking agent. The step of purifying the cross-linked hyaluronic acid may be by dialysis or washing with water or a buffer solution. However, the above-mentioned dialysis or washing cannot remove all of the residual cross-linking agent, especially because it has a bonding-state end and a free-state end. Furthermore, the free-state end of the cross-linking agent is still active and can create undesirable side effects when applied in animals, as shown by U.S. Pat. No. 5,808,050.

Also, the manufacture method for purifying the cross-linked hyaluronic acid by dialysis or washing also faces the following difficulties:

1. Refining cannot be easily scaled up at an industry level.
2. The cross-linked hyaluronic acid requires sterile conditions; otherwise, contaminants can easily be integrated into a final product. However, the manufacture method for the cross-linked hyaluronic acid by dialysis or washing is under neutral or almost neutral condition, so sterile conditions are almost always difficult to be controlled.
3. When the cross-linked hyaluronic acid is hydrogel and when the cross-linked hyaluronic acid with low degree of cross-linking swells significantly, the cross-linked hyaluronic acid is difficult to be washed and the cross-linked hyaluronic acid may be easily lost during the washing process. Similarly, when the cross-linked hyaluronic acid with high degree of cross-linking swells insignificantly, the cross-linking agent may not be capable of being removed with ease.
4. Moreover, the cross-linked hyaluronic acid with low degree of cross-linking can be easily washed away when washing the cross-linked hyaluronic acid, so that the residual cross-linked hyaluronic acid has decreased its lubrication. Therefore, when the cross-linked hyaluronic acid is used for injection, straight-chain or cross-linked hyaluronic acid solution has to be added in the residual cross-linked hyaluronic acid to increase its lubrication.

U.S. Pat. No. 4,716,154 discloses a manufacture method for a gel of cross-linked hyaluronic acid for use as a vitreous humor substitute, comprising: cross-lnking a hyaluronate with multifunctional cross-linking agent at 50° C. for two hours under alkaline condition and placing overnight at room temperature to obtain a gel; for removing un-reacted cross-linking agent, cutting the gel into small pieces and washing thoroughly for 24-hours using distilled water and further washing for 8 hours by boiled saline water to obtain gel with 0.23% to 1.2% of solid content. However, the foregoing method has the following shortcomings:

(1) a complex purifying step is required;
(2) the gel can swell and the gel content is low when removing cross-linking agent with boiled saline water and attaining a gel form. Therefore, the process needs extra step to improve the gel content; and
(3) the cross-linked hyaluronic acid has to swell again in the buffer solution to adjust the osmotic pressure and the pH value so that the method is unsuitable to be conducted at an industry level.

US 2006/0194758A1 discloses cross-linking of low and high molecular weight hyaluronic acids to obtain monophase hydrogels. The monophase hydrogels have good mechanical strength with improved properties for injection. However, the monophase hydrogels have residual cross-linking agent over 300 ppm after cross linking reaction at 50° C. Then, the residual cross-linking agent is intended to be removed by dialysis but the cross-linking agent cannot be removed thoroughly. Therefore, neither un-reacted cross-linking agent with two free-state ends nor reacted cross-linking agent with one free-state end and one bonding-state end in the hydrogels can be removed by dialysis or washing.

US 2005/0281880A1 discloses methods for making injecTable polymer hydrogels, comprising: (a) cross-linking one or more polymers to form a gel, (b) washing the gel, (c) purifying the gel, and (d) homogenizing the gel to produce the hydrogel. The method uses a di-functional or multifunctional cross-linking agent with high concentration to manufacture hydrogel. Therefore, the above-mentioned hydrogel contains residual cross-linking agents. Moreover, the hydrogel needs 2 to 3 days to wash and to purify the gel. However, the hydrogel is under almost neutral condition and may be polluted by microorganism.

US 2007/0026070A1 discloses a method for manufacturing a cross-linked polysaccharide composition comprising: (a) contacting a polysaccharide mixed in an alkaline medium with a bifunctional or polyfunctional epoxide to provide an essentially epoxy cross-linked polysaccharide, wherein the epoxide is substantially linked to the polysaccharide by ether bonds; (b) drying the epoxy cross-linked polysaccharide without substantially removing epoxide from the alkaline medium to form a cross-linked polysaccharide matrix; (c) optionally washing the cross-linked polysaccharide matrix with a water miscible solvent; and (d) neutralising the cross-linked polysaccharide matrix with an acidic medium to form a cross-linked polysaccharide gel. Therefore, the method delivers a product having residual cross-linking agents.

U.S. Pat. No. 4,716,224 discloses a method of manufacturing cross-linked hyaluronic acid using precipitation to remove the cross-linking agent. However, the method produces a product that still contains residual cross-linking agents.

When cross-linking polymers to form a gel in an alkaline medium, the cross-linking reaction competes with a hydrolysis reaction as shown by Y. Tokita and A Okamoto, "Hydrolytic Degration of Hyaluronic Acid", Polymer Degration and Stability, vol. 48, pp. 269-273 (1995). In the initial reaction period, the concentration of the cross-linking agent is high, so the cross-linking reaction is the principal reaction. But, after a specific amount of the cross-linking agent is consumed, the hydrolysis reaction becomes the principal reaction and destroys the gel causing gel degradation. Therefore, the cross-linking reaction in an alkaline medium has to be terminated before such secondary reaction occurs, despite the fact that the gel still contains much residual cross-linking agent. The manufacturing method comprises: cross-linking a hyaluronate and di-functional or multi-functional cross-linking agent in 25 to 60° C. for a period of between 10 minutes and 24 hours under basic condition to obtain a gel; and purifying the gel to remove cross-linking agents. However, the cross-linking agent cannot be removed thoroughly. An actual reaction time depends on the temperature and the basic condition. No matter how the gel obtained in foregoing methods intend to achieve purification, a certain/significant amount of cross-linking agents still remains in the cross-linked hyaluronic acid.

WO-00/46253 A1 discloses a process for the production of multiple cross-linked hyaluronic acid derives. The process comprises two cross-linking reactions at an uniform temperature, and the cross-linking agents, feeding ratios, and/or pH values of the two cross-linking reactions are different. However, the cross-linking agents with free-state functional group in the cross-linked hyaluronic acid obtained thereby is quite high and the cross-linked hyaluronic acid cannot be applied to a human or an animal directly. A washing step and/or a purifying step is necessary for obtaining a physiologically acceptable cross-linked hyaluronic acid where the residual cross-linking agent in the product is over 300 ppm.

A preparation of cross-linked hyaluronic acid is also disclosed by Tomihata and Ikada (Biomaterials, 1997, 18, 189-195). A strategy to remove a cross-linking agent with free-state functional group provided is elongation of the reaction time. However, a washing step and/or a purifying step is necessary for obtaining a physiologically acceptable cross-linked hyaluronic acid where the residual cross-linking agent in the product is over 300 ppm. Furthermore, a deterioration in the cross-linked hyaluronic acid occurs that causes the cross-linked hyaluronic acid to turn deep yellow or deep brown or cause a final product to degrade obviously.

To overcome the shortcomings, the present invention provides a method for producing a cross-linked hyaluronic acid to mitigate or to obviate the aforementioned problems.

SUMMARY OF THE INVENTION

The present invention provides a method for producing a cross-linked hyaluronic acid with a lower level of cross-linking agent.

A method for producing a cross-linked hyaluronic acid in accordance with the present invention comprises:
(a) cross-linking at least one polymer at a temperature, from about 35° C. to about 60° C., for a reaction time of from about 0.1 hour to about 72 hours with a cross-linking agent; and
(b) lowering the temperature in step (a) to form about 10° C. to about 30° C. for a reaction time of from about 48 hours to about 28 days to obtain the cross-linked hyaluronic acid.

The steps (a) and (b) are conducted under a basic condition.

The polymer is selected from the group consisting of hyaluronic acid, hyaluronate, carboxymethylcellulous (CMC), alginate, chondroitin-4-sulfate, chondroitin-6-sulfate, xanthane gum, chitosan, pectin, agar, carrageenan and guar gum thereof and a mixture thereof.

The method is absent a step of purifying the cross-linked hyaluronic acid and the content of the cross-linking agent with free-state functional group is below about 300 ppm in the cross-linked hyaluronic acid.

Other objectives, advantages and novel features of the invention will become more apparent from the following detailed description.

DETAILED DESCRIPTION OF THE INVENTION

A method for producing a cross-linked hyaluronic acid in accordance with the present invention comprises:
(a) cross-linking at least one polymer at a temperature, from about 35° C. to about 60° C., for a reaction time of from about 0.1 hour to about 72 hours with a cross-linking agent; and
(b) lowering the temperature in step (a) to from about 10° C. to about 30° C. for a reaction time of from about 48 hours to about 28 days to obtain the cross-linked hyaluronic acid.

The steps (a) and (b) are conducted under a basic condition.

The polymer is selected from the group consisting of hyaluronic acid, hyaluronate, carboxymethylcellulous (CMC), alginate, chondroitin-4-sulfate, chondroitin-6-sulfate, xanthane gum, chitosan, pectin, agar, carrageenan and guar gum thereof and a mixture thereof.

The method is absent a step of purifying the cross-linked hyaluronic acid and the content of the cross-linking agent with free-state functional group is below about 300 ppm in the cross-linked hyaluronic acid.

Preferably, the method is absent a step of washing the cross-linked hyaluronic acid.

Preferably, the method is absent a step of dialyzing the cross-linked hyaluronic acid.

In describing and claiming the present invention, the following terminologies will be used according to the definitions set out below.

The "hyaluronate" is a hyaluronic acid composed of a metal ion. Preferably, the hyaluronate is selected from the group consisting of sodium hyaluronate, potassium hyaluronate and zinc hyaluronate.

The molecular weight of the polymer selected from the group consisting of hyaluronic acid, hyaluronate, carboxymethylcellulous, alginate, chondroitin-4-sulfate, chondroitin-6-sulfate, xanthane gum, chitosan, pectin, agar, carrageenan and guar gum thereof and a mixture thereof is not limited to those identified in the invention, and can refer to low molecular weight, high molecular weight, or a mixture having low and high molecular weight of the polymer, such as below 100,000 D; from 100,000 to 500,000 D; from 500,000 to 1,000,000 D; from 1,000,000 to 1,500,000 D; from 1,500,000 to 2,000,000 D, from 2,500,000 to 3,000,000 D or the like.

Preferably, a reactant initial concentration of polymer is from about 2 w/v % to about 40 w/v %. More preferably, a concentration of polymer is from about 10 w/v % to about 30 w/v %. Most preferably, a concentration of polymer is from about 15 w/v % to about 20 w/v %.

The "cross-linked hyaluronic acid" has a network-structure when the polymer partially cross-linked or thoroughly cross-linked by a cross-linking agent. The cross-linked hyaluronic acid may be solid, liquid (when the cross-linked hyaluronic acid is dissolved in water or buffer solution), hydrogel (when the cross-linked hyaluronic acid swells in water or buffer solution), a mixture between liquid and hydrogel or water-insoluble solid. Types of the cross-linked hyaluronic acid depend on cross-linked agent content and method used for manufacturing the cross-linked hyaluronic acid. In the present invention, the cross-linked hyaluronic acid may be solid, liquid, hydrogel or a mixture of a combination of the above. The solid cross-linked hyaluronic acid may be particle, spongy, strip, spherical, elliptical or the like.

In the cross-linking reaction, two of the polymers form a chemical bond such as an ether bond in the present invention between two straight chains without producing by-product so a cross-linking reaction can be theoretically proceeded completely.

The method of the invention can be produced under specific conditions (e.g. sterile condition), or common conditions. Because the method uses a basic condition, bacterium does not grow thereof, therefore avoiding risks of contamination caused by washing hydrogel.

Preferably, the temperature in step (a) is from about 35° C. to about 50° C. More preferably, the temperature in step (a) is from about 35° C. to about 40° C. This allows partial cross-linking of the polymer before deterioration begins.

Preferably, when the temperature in step (a) is from about 35° C. to lower than about 40° C., the cross-linking reaction is proceeded for a period of less than 72 hours; more preferably for 4 to 48 hours; most preferably for 6 to 12 hours.

Preferably, when the temperature in step (a) is from about 40° C. to lower than about 50° C., the cross-linking reaction is proceeded for a period of less than 48 hours; more preferably for 2 to 24 hours; most preferably for 3 to 6 hours.

Preferably, when the temperature in step (a) is from about 50° C. to lower than about 60° C., the cross-linking reaction is proceeded for a period of less than 8 hours; more preferably for 0.1 to 2 hours; most preferably proceed for 0.2 to 1 hour.

Preferably, when the temperature in step (a) is about 60° C., the cross-linking reaction is proceeded for a period of less than 2 hours; more preferably for 0.1 to 0.5 hour; most preferably for 0.2 to 0.3 hour.

The step (b) according to the invention is lowering the temperature in step (a) to from about 10° C. to about 30° C. for a reaction time of from about 48 hours to about 28 days to obtain the cross-linked hyaluronic acid. Preferably, the temperature in step (b) is from about 10° C. to about 30° C. More preferably, the temperature in step (b) is from about 15° C. to about 30° C. Most preferably, the temperature in step (b) is from about 20° C. to about 30° C. Since hydrolysis of cross-linked hyaluronic acid does not occur under a basic condition at the low temperature, cross-linked hyaluronic acid will not experience rapidly rapidly deterioration and the cross-linking reaction will terminate when the cross-linking agent is consumed to a reasonable concentration.

Preferably, the reaction time in step (b) is from about 3 days to about 28 days. More preferably, the reaction time in step (b) is from about 3 days to about 11 days. Most preferably, the reaction time is from about 3 days to about 7 days. The reaction time is depended on the concentration of the cross-linking agent and base, and the reaction temperature.

Preferably, the basic condition are prepared by an inorganic base, wherein the inorganic acid is selected from the group consisting of sodium hydroxide, potassium hydroxide and a mixture thereof.

Preferably, the basic condition is in a concentration from about 0.05 N to about 1.5 N. More preferably, the concentration is from about 0.05 N to about 1 N. More preferably, the concentration is from about 0.2 N to about 1.5 N. More preferably, the concentration is from about 0.2 N to about 1.0 N. Most preferably, the concentration is from about 0.25 N to about 0.5 N.

Preferably, the cross-linking agent is a multifunctional cross-linking agent.

More preferably, the cross-linking agent is a di-functional cross-linking agent.

Preferably, the cross-linking agent is selected from the group consisting of 1,4-butanediol diglycidyl ether, ethylene glycol diglycidyl ether, 1,6-hexanediol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, trimethylolpropane polyglycidyl ether, pentaerythritol polyglyglycidyl ether, sorbitol polyglycidyl ether, 1,2,7,8-diepoxyoctane, 1,3-butadiene diepoxide and a mixture thereof.

Preferably, a concentration of the cross-linking agent is from about 0.05 w/v % to about 2 w/v %. More preferably, a concentration of the cross-linking agent is from about 0.1 w/v % to about 1.5 w/v %. More preferably, a concentration of the cross-linking agent is from about 0.1 w/v % to about 1.0 w/v %. Most preferably, a concentration of the cross-linking agent is from about 0.6 w/v % to about 1.0 w/v %.

Preferably, the method for producing the cross-linked hyaluronic acid further comprises a step of diluting the cross-linked hyaluronic acid. Diluting the cross-linked hyaluronic acid for adjusting the cross-linked hyaluronic acid to a desired concentration and an acceptable osmotic pressure and pH value in animal physiology may comprise of dilution using water, neutral solution, buffer solution, salt solution or a mixture thereof.

For example, a preferable concentration of the cross-linked hyaluronic acid is from 5 mg/mL to 60 mg/mL, more preferably from 10 mg/mL to 40 mg/mL, most preferably from 20 mg/mL to 30 mg/mL, and a preferable osmotic pressure is from 280 to 340 mOsm/kg.

Preferably, the method for producing the cross-linked hyaluronic acid further comprises a step of neutralizing cross-linking reaction with pH value preferably between 6.5 and 7.5 so that it can be used on animals. The neutralizing the cross-linking reaction environment step and the diluting the cross-linked hyaluronic acid step may be conducted simultaneously.

Preferably, the method for producing the cross-linked hyaluronic acid further comprises a homogenizing the cross-linked hyaluronic acid step to form a dispersing particle.

The "cross-linking agent with a free-state functional group" indicates that the cross-linking agent of at least one function group is un-reacted with the polymer selected from the group consisting of hyaluronic acid, hyaluronate, carboxymethylcellulous, alginate, chondroitin-4-sulfate, chondroitin-6-sulfate, xanthane gum, chitosan, pectin, agar, carrageenan and guar gum thereof and a mixture thereof.

Said deterioration in the cross-linked hyaluronic acid can cause the cross-linked hyaluronic acid to turn deep yellow or deep brown after the cross-linking reaction due to hydrolysis of cross-linked hyaluronic acid under a basic condition, or can cause a final product to degrade obviously. In the present invention, the deterioration is limited to light yellow or light brown just because the cross-linked hyaluric acid used is light yellow or light brown.

Consuming cross-linking agent within a reasonable concentration indicates that the concentration of the cross-linking agent within the cross-linked product can, following the aforementioned steps, be below 1 ppm, 2 ppm, 5 ppm, 10 ppm, 15 ppm, 20 ppm, 100 ppm, 200 ppm, or 300 ppm. However, the consuming concentration of the cross-linking agent is not intended to limit the scope of the present invention. The fact that the cross-linking agent is consumed is resulting not only from cross-linking reaction but also from hydrolysis reaction. In an embodiment of the present invention, un-reacted cross-linking agent can be controlled at below 1 ppm, 1 ppm to 2 ppm, 2 ppm to 5 ppm, 5 ppm to 10 ppm, 10 ppm to 15 ppm, 15 ppm to 20 ppm, 20 ppm to 100 ppm, 100 ppm to 200 ppm, or 200 ppm to 300 ppm.

The following examples further illustrate the present invention but are not to be construed as limiting the invention as defined in the claims appended hereto.

EXAMPLE 1

Sodium hyaluronate concentration of 20 w/v %, base concentration of 0.5 N, low reaction temperature of 30° C. and cross-linking agent (1,2,7,8-diepoxyoctane) concentration of 1 v/v % have been chosen.

8.9 mL of deionized water is added into 1 mL of 5N sodium hydroxide solution, 0.1 mL of 1,2,7,8-diepoxyoctane, and 2 g sodium hyaluronate (dry weight) of high molecular weight hyaluronic acid (HHA, average molecular weight 1,350,000), under constant stirring by a magnetic stirring bar at room temperature for 5 minutes and is placed in a thermostatic container held at 30° C. for various reaction times as shown in Table 1.

The cross-linked hyaluronic acid is added to 79.2 mL of pH 7.0±0.2 of 0.073 M phosphate buffer solution and 0.8 mL of 6 N hydrogen chloride solution to regulate the pH value and osmotic pressure and to adjust it to be suitable for the physiology of animals; then, the cross-linked hyaluronic acid has been homogenized.

A method to determine the amount of cross-linking agent with free-state functional group in the cross-linked hyaluronic acid comprises a hydrolysis step with hyaluronidase and the method used by Nelis and Sinsheimer (A sensitive Fluorimetric for the Determination of Aliphatic Epoxides under Physiological Conditions, Anal. Biochem., Vol. 115, pp. 151-157, 1981). A calibration of the above-mentioned method provides a good linear model when the content of the cross-linking agent with free-state functional group is between 1 and 300 ppm in the cross-linked hyaluronic acid.

0.1 g of cross-linked hyaluronic acid is added to a 50 mL certified volumetric flask and 3 mL of 6 N sulfuric acid solution is added to dissolve the cross-linked hyaluronic acid. After cross-linked hyaluronic acid has dissolved, deionized water is added by a scale of the certified volumetric flask. Then, using the method of European Pharmacopoeia 4.0 (2002) the glucuronic acid content is determined for calculating the cross-linked hyaluronic acid content. The cross-linked hyaluronic acid content and content of residual cross-linking agent with free-state functional group in the product have been recorded with different reaction times as shown in Table 1.

EXAMPLE 2

Sodium hyaluronate concentration of 20 w/v %, base concentration of 0.5 N, low reaction temperature of 30° C. and cross-linking agent (1,3-butadiene diepoxide) concentration of 1 v/v % have been chosen.

The method of example 1 is followed except that the cross-linking agent is now 1,3-butadiene diepoxide. The cross-linked hyaluronic acid content and content of residual cross-linking agent with free-state functional group have been recorded with different reaction times as shown in Table 1.

EXAMPLE 3

Sodium hyaluronate concentration of 20 w/v %, base concentration of 0.25 N, low reaction temperature of 10° C. and cross-linking agent (1,4-butanediol diglycidyl ether) concentration of 1 v/v % have been chosen.

9.4 mL of deionized water is added to 0.5 mL of 5N sodium hydroxide solution, 0.1 mL of 1,4-butanedion diglycidyl ether, and 2 g (dry weight) sodium hyaluronate of high molecular weight hyaluronic acid (HHA, average molecular weight 1,350,000), under constant stirring by a magnetic stirring bar at room temperature for 5 minutes and is placed in a thermostatic container maintained at 10° C. for reaction times shown in Table 1. The cross-linked hyaluronic acid is added to 79.6 mL of pH 7.0±0.2 of 0.1 M phosphate buffer solution and 0.4 mL of 6 N hydrogen chloride solution to regulate the pH value and osmotic and to adjust it to be suitable for the physiology of animals. Then, the cross-linked hyaluronic acid has been homogenized.

The method to determine amount of cross-linking agent with free-state functional group in cross-linked hyaluronic acid in example 1 is used. The cross-linked hyaluronic acid content and content of residual cross-linking agent with free-state functional group have been recorded with different reaction times as shown in Table 1.

EXAMPLE 4

Sodium hyaluronate concentration of 20 w/v %, base concentration of 0.25 N, low reaction temperature of 20° C. and cross-linking agent (1,4-butanediol diglycidyl ether) concentration of 1 v/v % have been chosen.

The method of the example 3 is used, except that the low reaction temperature has varied. The cross-linked hyaluronic acid content and content of residual cross-linking agent with free-state functional group have been recorded with different reaction times as shown in Table 1.

EXAMPLE 5

Sodium hyaluronate concentration of 20 w/v %, base concentration of 0.25 N, low reaction temperature of 30° C. and cross-linking agent (1,4-butanediol diglycidyl ether) concentration of 1 v/v % have been chosen.

The method of example 3 is used, except that the low reaction temperature has varied. The cross-linked hyaluronic acid content and content of residual cross-linking agent with free-state functional group have been recorded with different reaction times as shown in Table 1.

EXAMPLE 6

Sodium hyaluronate concentration of 20 w/v %, base concentration of 0.2 N, low reaction temperature of 30° C. and cross-linking agent (1,4-butanediol diglycidyl ether) concentration of 1 v/v % have been chosen.

9.5 mL of deionized water is added to 0.4 mL of 5N sodium hydroxide solution, 0.1 mL of 1,4-butanedion diglycidyl ether, and 2 g (dry weight) hyaluronic acid of high molecular weight hyaluronic acid (HHA, average molecular weight 1,350,000), under constant stirring by a magnetic stirring bar at room temperature for 5 minutes and is placed in a thermostatic container maintained at 30° C. for reaction times shown in Table 1. The cross-linked hyaluronic acid is added into 79.68 mL of pH 7.0±0.2 of 0.1 M phosphate buffer solution and 0.32 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid is the same as example 1. The cross-linked hyaluronic acid content and the content of residual cross-linking agent with free-state functional group have been recorded with different reaction times as shown in Table 1.

Table 1 shows that when the reaction time of the cross-linking reaction is over 2 days, the cross-linked hyaluronic acid can be used on animals.

TABLE 1

| Example | Reaction temperature (° C.) | Reaction Time (day) | Cross-linked hyaluronic acid content in product (w/v %) | Cross-linked agent with free-state functional group in product (ppm) |
|---|---|---|---|---|
| 1 | 30 | 1 | 1.85 | 64.64 |
|   |    | 2 | 1.91 | 5.68 |
|   |    | 3 | 1.89 | 3.15 |
|   |    | 4 | 1.86 | <1* |
| 2 | 30 | 1 | 1.94 | 15.95 |
|   |    | 2 | 1.89 | 4.25 |
|   |    | 3 | 1.96 | <1* |
| 3 | 10 | 14 | 2.09 | 42.67 |
|   |    | 21 | 2.06 | 12.16 |
|   |    | 28 | 1.95 | <1* |
| 4 | 20 | 1 | 2.02 | 441.08 |
|   |    | 3 | 1.95 | 157.04 |
|   |    | 5 | 2.05 | 47.32 |
|   |    | 7 | 1.98 | 9.26 |
|   |    | 9 | 1.98 | 1.71 |
|   |    | 11 | 1.98 | <1* |
| 5 | 30 | 1 | 1.91 | 167.91 |
|   |    | 2 | 1.97 | 30.25 |
|   |    | 3 | 1.94 | 9.87 |
|   |    | 4 | 1.83 | 1.89 |
|   |    | 5 | 1.95 | <1* |
| 6 | 30 | 1 | 1.95 | 247.69 |
|   |    | 2 | 2.00 | 79.92 |
|   |    | 3 | 2.03 | 24.38 |
|   |    | 4 | 1.82 | 9.05 |
|   |    | 5 | 1.95 | 4.57 |
|   |    | 6 | 1.90 | 2.51 |
|   |    | 7 | 1.98 | <1* |

Note:
*represents it is not in the range of calibration (between 1 to 300 ppm).

EXAMPLE 7

Sodium hyaluronate concentration of 10 w/v %, base concentration of 0.05 N, high reaction temperature of 50° C., low reaction temperature of 30° C. and cross-linking agent (1,4-butanediol diglycidyl ether) concentration of 1 v/v % have been chosen.

9.8 mL of deionized water is added to 0.1 mL of 5 N sodium hydroxide solution, 0.1 mL of 1,4-butanedion diglycidyl ether, and 1 g (dry weight) sodium hyaluronate of high molecular weight hyaluronic acid, HHA (average molecular weight 1,350,000) under continuous stirring by a magnetic stirring bar at room temperature for 5 minutes and is placed in a thermostatic container maintained at 50° C. for 7 hours and then at 30° C. for a specific reaction time shown in Table 2.

The cross-linked hyaluronic acid is added to 9.87 mL of deionized water, 20 mL of pH 7.0±0.2 of 0.15 M phosphate buffer solution and 0.13 mL of 6 N hydrogen chloride solution to regulate the pH value and osmotic pressure and to adjust it to be suitable for the physiology of animals. Then, the cross-linked hyaluronic acid has been homogenized.

The method to determine amount of cross-linking agent with free-state functional group in cross-linked hyaluronic acid is the same as example 1. The cross-linked hyaluronic acid content and the content of residual cross-linking agent with free-state functional group have been recorded with different reaction times as shown in Table 2.

EXAMPLE 8

Sodium hyaluronate concentration of 20 w/v %, base concentration of 0.5 N, high reaction temperature of 40° C., low reaction temperature of 25° C. and cross-linking agent (1,4-butanediol diglycidyl ether) concentration of 1 v/v % have been chosen.

8.9 mL of deionized water is added to 1 mL of 5N sodium hydroxide solution, 0.1 mL of 1,4-butanediol diglycidyl ether, and 2.0 g (dry weight) sodium hyaluronate of high molecular weight hyaluronic acid, HHA (average molecular weight 1,350,000), under continuous stirring by a magnetic stirring bar at room temperature for 5 minutes and is placed in a thermostatic container held at 40° C. for 3 hours and the at 25° C. for a specific reaction time shown in Table 2.

The cross-linked hyaluronic acid is added to 79.2 mL of pH 7.0±0.2 of 0.073 M phosphate buffer solution and 0.8 mL of 6 N hydrogen chloride solution to regulate pH value and osmotic pressure and to adjust it to be suitable for the physiology of animals. Then, the cross-linked hyaluronic acid has been homogenized.

The method to determine the amount of cross-linking agent with free-state functional group in the cross-linked hyaluronic acid is the same as example 1. The cross-linked hyaluronic acid the content and content of residual cross-linking agent with free-state functional group have been recorded with different reaction times as shown in Table 2.

EXAMPLE 9

Sodium hyaluronate concentration of 20 w/v %, base concentration of 0.5 N, high reaction temperature of 40° C., low reaction temperature of 25° C. and cross-linking agent (1,2,7,8-diepoxyoctane) concentration of 1 v/v % have been chosen.

The method of example 8 is used, except that the cross-linking agent is now 1,2,7,8-diepoxyoctane. The cross-linked hyaluronic acid content and the content of residual cross-linking agent with free-state functional group have been recorded with different reaction times as shown in Table 2.

EXAMPLE 10

Sodium hyaluronate concentration of 20 w/v % (10 w/v % HHA and 10 w/v % LHA), base concentration of 0.25 N, high reaction temperature of 40° C., low reaction temperature of 10° C. and cross-linking agent (1,4-butanediol diglycidyl ether) concentration of 0.6 v/v % have been chosen.

9.44 mL of deionized water is added to 0.5 mL of 5N sodium hydroxide solution, 0.06 mL of 1,4-butanediol diglycidyl ether, 1 g (dry weight) of high molecular weight sodium hyaluronate, HHA (average molecular weight 1,350,000) and 1 g (dry weight) of low molecular weight sodium hyaluronate, LHA (average molecular weight 440,000), under continuous stirring by a magnetic stirring bar at room temperature for 5 minutes and is placed in a thermostatic container held at 40° C. for 4 hours and then at 10° C. for a specific reaction time shown in Table 2.

The cross-linked hyaluronic acid is added to 79.6 mL of pH 7.0±0.2 of 0.1 M phosphate buffer solution and 0.4 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid of example 1 is used. The cross-linked hyaluronic acid content and the content of residual cross-linking agent with free-state functional group have been recorded with different reaction times as shown in Table 2.

EXAMPLE 11

Sodium hyaluronate concentration of 30 w/v % (15 w/v % HHA and 15 w/v % LHA), base concentration of 0.25 N, high reaction temperature of 40° C., low reaction temperature of 25° C. and cross-linking agent (1,4-butanedionl diglycidyl ether) concentration of 0.6 v/v % have been chosen.

9.44 mL of deionized water is added to 0.5 mL of 5N sodium hydroxide solution, 0.06 mL of 1,4-butanediol diglycidyl ether, 1.5 g (dry weight) of high molecular weight sodium hyaluronate, HHA (average molecular weight 1,350,000) and 1.5 g (dry weight) of low molecular weight sodium hyaluronate, LHA (average molecular weight 440,000) under continuous stirring by a magnetic stirring bar at room temperature for 5 minutes and is placed in a thermostatic container held at 40° C. for 4 hours and then at 25° C. for a specific reaction time as shown in Table 2.

The cross-linked hyaluronic acid is added to 79.6 mL of pH 7.0±0.2 of 0.10 M phosphate buffer solution and 0.4 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid of example 1 is used. The cross-linked hyaluronic acid content and the content of residual cross-linking agent with free-state functional group have been recorded with different reaction times as shown in Table 2.

EXAMPLE 12

Sodium hyaluronate concentration of 20 w/v % LHA, base concentration of 0.25 N, high reaction temperature of 40° C., low reaction temperature of 25° C. and cross-linking agent (1,4-butanediol diglycidyl ether) concentration of 0.6 v/v % have been chosen.

The method of the example 11 is used except 2 g (dry weight) of low molecular weight sodium hyaluronate is hereby used. The cross-linked hyaluronic acid content and the content of residual cross-linking agent with free-state functional group have been recorded with different reaction times as shown in Table 2.

EXAMPLE 13

Sodium hyaluronate concentration of 20 w/v % (10 w/v % HHA and 10 w/v % LHA), base concentration of 0.25 N, high reaction temperature of 40° C., low reaction temperature of 25° C. and cross-linking agent (1,4-butanediol diglycidyl ether) concentration of 0.1 v/v % have been chosen.

9.49 mL of deionized water is added to 0.5 mL of 5N sodium hydroxide solution, 0.01 mL of 1,4-butanediol diglycidyl ether, 1.0 g of high molecular weight sodium hyaluronate, HHA (average molecular weight 1,350,000) and 1.0 g of low molecular weight sodium hyaluronate, LHA (average molecular weight 440,000) under continuous stirring by a magnetic stirring bar at room temperature for 5 minutes and is placed in a thermostatic container held at 40° C. for 4 hours and then at 25° C. for a specific reaction time shown in Table 2.

The cross-linked hyaluronic acid is added to 79.6 mL of pH 7.0±0.2 of 0.10 M phosphate buffer solution and 0.4 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid of example 1 is used. The cross-linked hyaluronic acid content and the content of residual cross-linking agent with free-state functional group have been recorded with different reaction times as shown in Table 2.

EXAMPLE 14

Sodium hyaluronate concentration of 20 w/v % LHA, base concentration of 0.2 N, high reaction temperature of 40° C., low reaction temperature of 30° C. and cross-linking agent (1,4-butanediol diglycidyl ether) concentration of 1 v/v % have been chosen.

9.5 mL of deionized water is added to 0.4 mL of 5 N sodium hydroxide solution, 0.1 mL of 1,4-butanediol diglycidyl ether, and 2.0 g (dry weight) of low molecular weight sodium hyaluronate, LHA (average molecular weight 440,000), under continuous stirring by a magnetic stirring bar at room temperature for 5 minutes and is placed in a thermostatic container held at 40° C. for 4 hours and then at 30° C. for a specific reaction time shown in Table 2.

The cross-linked hyaluronic acid is added to 79.68 mL of pH 7.0±0.2 of 0.10 M phosphate buffer solution and 0.32 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid of example 1 is used. The cross-linked hyaluronic acid content and the content of residual cross-linking agent with free-state functional group have been recorded with different reaction times as shown in Table 2.

EXAMPLE 15

Sodium hyaluronate concentration of 10 w/v % HHA, carboxymethyl cellulose (sodium salt) of 10 w/v %, base concentration of 0.3 N, high reaction temperature of 40° C., low reaction temperature of 20° C. and cross-linking agent (1,4-butanediol diglycidyl ether) concentration of 0.6 v/v % have been chosen.

9.34 mL of deionized water is added to 0.6 mL of 5 N sodium hydroxide solution, 0.4 g sodium chloride, 0.06 mL of 1,4-butanediol diglycidyl ether, 1.0 g (dry weight) of high molecular weight sodium hyaluronate, HHA, and 1.0 g (dry weight) of carboxymethyl cellulose (sodium salt) under continuous stirring by a magnetic stirring bar at room temperature for 5 minutes and is placed in a thermostatic container held at 40° C. for 4 hours and then at 20° C. for a specific reaction time shown in Table 2.

The cross-linked hyaluronic acid is added to 79.50 mL of pH 7.0±0.2 of 0.01 M phosphate buffer solution and 0.5 mL of 6 N hydrogen chloride solution to regulate the pH value and osmotic pressure and to adjust it to be suitable for the physiology of animals. Then, the cross-linked hyaluronic acid has been homogenized.

The method to determine the amount of the cross-linking agent with free-state functional group in the cross-linked hyaluronic acid of example 1 is used, except that the hydrolysis enzyme is now the mixture of hyaluronidase and cellulase (celluclast 1.5 L, Novo Nordisk Ferment Ltd.). The cross-linked hyaluronic acid content and the content of residual cross-linking agent with free-state functional group have been recorded with different reaction times as shown in Table 2.

When the reaction time of the cross-linking reaction is over 2 days, the cross-linked hyaluronic acid can be used for animal.

TABLE 2

| Example | High temperature °C. | Time (hours) | Low temperature °C. | Time (days) | Cross-linked hyaluronic acid content in product (w/v %) | Cross-linked agent with free-state functional group in product (ppm) |
|---|---|---|---|---|---|---|
| 7 | 50 | 7 | 30 | 5 | 2.25 | 189.35 |
|   |   |   |   | 9 | 1.82 | 145.49 |
|   |   |   |   | 11 | 2.15 | 64.34 |
|   |   |   |   | 13 | 2.10 | 54.45 |
|   |   |   |   | 15 | 2.07 | 27.14 |
|   |   |   |   | 17 | 2.09 | 16.41 |
|   |   |   |   | 24 | 2.04 | 15.50 |
|   |   |   |   | 28 | 2.14 | 11.81 |
| 8 | 40 | 3 | 25 | 0 | 1.82 | 313.53* |
|   |   |   |   | 1 | 1.92 | 24.54 |
|   |   |   |   | 2 | 1.83 | 4.38 |
|   |   |   |   | 3 | 1.96 | <1* |
| 9 | 40 | 3 | 25 | 0 | 1.86 | 365.13* |
|   |   |   |   | 1 | 1.81 | 111.77 |
|   |   |   |   | 2 | 1.88 | 23.37 |
|   |   |   |   | 3 | 2.04 | 5.90 |
|   |   |   |   | 4 | 1.91 | <1* |
| 10 | 40 | 4 | 10 | 0 | 1.82 | 297.81 |
|   |   |   |   | 14 | 1.87 | 7.67 |
|   |   |   |   | 18 | 2.01 | 2.97 |
|   |   |   |   | 23 | 1.89 | <1 |
| 11 | 40 | 4 | 25 | 0 | 2.04 | 218.05 |
|   |   |   |   | 1 | 2.05 | 95.08 |
|   |   |   |   | 2 | 1.79 | 37.50 |
|   |   |   |   | 3 | 2.07 | 15.96 |
|   |   |   |   | 4 | 1.93 | 8.66 |
|   |   |   |   | 5 | 1.90 | <1 |
| 12 | 40 | 4 | 25 | 0 | 1.98 | 331.94* |
|   |   |   |   | 1 | 1.86 | 123.51 |
|   |   |   |   | 2 | 1.99 | 54.89 |
|   |   |   |   | 3 | 1.81 | 21.44 |
|   |   |   |   | 4 | 1.77 | 10.58 |
|   |   |   |   | 5 | 1.87 | <1* |
| 13 | 40 | 4 | 25 | 0 | 1.91 | 46.27 |
|   |   |   |   | 1 | 1.91 | 19.62 |
|   |   |   |   | 2 | 1.94 | 5.37 |
|   |   |   |   | 3 | 1.79 | <1 |
| 14 | 40 | 4 | 30 | 1 | 1.86 | 162.98 |
|   |   |   |   | 2 | 1.87 | 50.66 |
|   |   |   |   | 3 | 1.97 | 16.09 |
|   |   |   |   | 4 | 1.81 | 5.42 |
|   |   |   |   | 5 | 1.80 | 1.32 |
|   |   |   |   | 6 | 1.78 | <1* |
| 15 | 40 | 4 | 20 | 1 | 2 | 162.21 |
|   |   |   |   | 2 | 2 | 73.14 |
|   |   |   |   | 3 | 2 | 29.35 |
|   |   |   |   | 4 | 2 | 11.13 |
|   |   |   |   | 5 | 2 | 3.04 |
|   |   |   |   | 6 | 2 | 1.02 |
|   |   |   |   | 7 | 2 | <1* |

Even though numerous characteristics and advantages of the present invention have been set forth in the foregoing description, together with details of the structure and function of the invention, the disclosure is only illustrative. Changes may be made to the details, especially regarding the shape, size, and arrangement of parts within the principles of the invention to the full extent as indicated by the broad general meaning of the terms in which the appended claims are expressed.

What is claimed is:

1. A method for producing a cross-linked hyaluronic acid gel composition suitable to be applied directly to an animal comprising a cross-linking step, wherein the cross-linking step consists of:
    (a) cross-linking at least one polymer at a first constant temperature, from about 35° C. to about 50° C., for a reaction time of from about 3 hours to about 12 hours with a cross-linking agent, wherein the cross-linking agent is at a concentration of from about 0.6 w/v % to about 1.0 w/v %; and
    (b) continuing cross-linking the at least one polymer with the cross-linking agent after step (a) by cooling the first constant temperature to a second constant temperature from about 10° C. to about 30° C. for a reaction time of from about 3 days to about 28 days to obtain the cross-linked hyaluronic acid,
    wherein the steps (a) and (b) are conducted under a basic condition of about 0.2 N to about 1.0 N;
    the at least one polymer comprises hyaluronic acid, or hyaluronate or a mixture thereof;
    the method is absent a step of purifying the cross-linked hyaluronic acid;
    the content of the cross-linking agent with free-state functional group is below about 2 ppm in the cross-linked hyaluronic acid gel composition; and
    the cross-linking agent is 1,4-butanediol diglycidyl ether.

2. The method for producing the cross-linked hyaluronic acid as claimed in claim 1, wherein the hyaluronate is selected from the group consisting of sodium hyaluronate, potassium hyaluronate and zinc hyaluronate.

3. The method for producing the cross-linked hyaluronic acid as claimed in claim 1, wherein a concentration of the polymer is from about 2 w/v % to about 40 w/v %.

4. The method for producing the cross-linked hyaluronic acid as claimed in claim 1, wherein the temperature in step (a) is from about 35° C. to about 40° C.

5. The method for producing the cross-linked hyaluronic acid as claimed in claim 1, wherein the temperature in step (b) is from about 15° C. to about 30° C.

6. The method for producing the cross-linked hyaluronic acid as claimed in claim 5, wherein the temperature in step (b) is from about 20° C. to about 30° C.

7. The method for producing the cross-linked hyaluronic acid as claimed in claim 1, wherein the basic condition is achieved by an inorganic base.

8. The method for producing the cross-linked hyaluronic acid as claimed in claim 7, wherein the inorganic base is selected from the group consisting of sodium hydroxide, potassium hydroxide and a mixture thereof.

9. The method for producing the cross-linked hyaluronic acid as claimed in claim 1, further comprising a step of diluting the cross-linked hyaluronic acid.

10. The method for producing the cross-linked hyaluronic acid as claimed in claim 1, further comprising a step of neutralizing the cross-linked hyaluronic acid.

11. The method for producing the cross-linked hyaluronic acid as claimed in claim 1, further comprising a step of homogenizing the cross-linked hyaluronic acid.

12. The method for producing the cross-linked hyaluronic acid as claimed in claim 1, wherein the polymer further comprises carboxymethylcellulose (CMC), alginate, chondroitin-4-sulfate, chondroitin-6-sulfate, xanthan gum, chitosan, pectin, agar, carrageenan or guar gum or a mixture thereof.

* * * * *